United States Patent [19]
Okamoto et al.

[11] Patent Number: 5,956,517
[45] Date of Patent: Sep. 21, 1999

[54] DATA DRIVEN INFORMATION PROCESSOR

[75] Inventors: Toshiya Okamoto, Kyoto; Tsuyoshi Muramatsu, Nara, both of Japan

[73] Assignee: Sharp Kabushiki Kaisha, Osaka-fu, Japan

[21] Appl. No.: 08/618,376

[22] Filed: Mar. 19, 1996

[30]    Foreign Application Priority Data

Apr. 12, 1995    [JP]    Japan .................................... 7-086764

[51] Int. Cl.⁶ .................................................. G06F 15/00
[52] U.S. Cl. ............... 395/800.01; 395/377; 395/800.18; 395/800.25
[58] Field of Search ..................... 395/800, 377, 395/800.01, 800.18, 800.25; 711/154

[56]    References Cited

U.S. PATENT DOCUMENTS

| | | | |
|---|---|---|---|
| 5,125,097 | 6/1992 | Okamoto et al. | 395/800 |
| 5,241,683 | 8/1993 | Okamoto | 395/800 |
| 5,323,387 | 6/1994 | Miyata et al. | 370/60 |
| 5,404,558 | 4/1995 | Okamoto | 395/800 |
| 5,448,745 | 9/1995 | Okamoto | 395/800 |
| 5,454,115 | 9/1995 | Okamoto | 395/800 |
| 5,483,661 | 1/1996 | Yoshida et al. | 395/800 |
| 5,497,344 | 3/1996 | Okamoto | 395/800 |
| 5,502,720 | 3/1996 | Muramatsu | 370/60 |
| 5,542,079 | 7/1996 | Hatakeyama | 395/800 |
| 5,586,281 | 12/1996 | Miyama et al. | 395/405 |

OTHER PUBLICATIONS

"An evaluation of Parallel–Processing in the Dynamic Data Driven Processor", pp. 9–18, Date: Nov. 12, 1991, Micro Computer Architecture Symposium.

*Primary Examiner*—Tod R. Swann
*Assistant Examiner*—Tuan V. Thai

[57]    ABSTRACT

A data driven information processor includes an operation processor unit for prestoring a data flow program and carrying out processing, and a storage microprocessor unit having a plurality of data memories including external data memories for inputting/outputting data to and from the operation processor unit. In the storage microprocessor unit, a plurality of data memories are accessed, in parallel, based on the content of an applied data packet for a single access time. The result of each access is operated in accordance with the content of the data packet. Finally, the subsequent program is read from a data flow program prestored in the storage microprocessor unit so that access to the plurality of data memories and processing of a result of the access continue in the storage microprocessor unit. Thus, in the information processor, parallel access to a plurality of data memories can be achieved by program control independent of program control by the operation processor unit.

37 Claims, 12 Drawing Sheets

H/T: WORD IDENTIFICATION FLAG
CTL: EXTERNAL CONTROL SYSTEM TRANSFER INDICATION FLAG
VMA: VIDEO MEMORY ACCESS INSTRUCTION IDENTIFICATION FLAG
D/S: TWO-TERM/SINGLE-TERM OPERATION INSTRUCTION IDENTIFICATION FLAG
L/R: TWO-INPUT NODE LEFT/RIGHT IDENTIFICATION CODE

ACCESS RANGE OF IVM AND EVM INSTRUCTIONS

FIG. 7B

ADDRESS MODIFICATION OF IVM AND EVM INSTRUCTIONS

Δfd: FIELD OFFSET VALUE
Δln: LINE OFFSET VALUE
Δpx: PIXEL OFFSET VALUE

ADDRESS UPON EXECUTION(24 BITS)

| fd | ln | px |
|---|---|---|
| (3) | (11) | (10) |

CONSTANT VALUE(16 BITS)

| C | ΔDcPx | ΔDmPx |
|---|---|---|
| (4) | (6) | (6) |

| fd | ln | px+ΔDcPx |
|---|---|---|
| (3) | (11) | (10) |

ADDRESS OF DATA CACHE
TO BE ACCESSED

| fd | ln | px+ΔDmPx |
|---|---|---|
| (3) | (11) | (10) |

ADDRESS OF INTERNAL DATA
MEMORY TO BE ACCESSED

ΔDcPx:PIXEL OFFSET VALUE OF DATA CACHE
ΔDmPx:PIXEL OFFSET VALUE OF DATA MEMORY
C:ARBITRARY CONSTANT

ADDRESS UPON EXECUTION(24 BITS)

| fd  | ln   | px   |
|-----|------|------|
| (3) | (11) | (10) |

CONSTANT VALUE(16 BITS)

| C   | ΔDmLx | Δpx |
|-----|-------|-----|
| (4) | (6)   | (6) |

| fd  | ln   | px+Δpx |
|-----|------|--------|
| (3) | (11) | (10)   |

ADDRESS OF DATA CACHE
TO BE ACCESSED

| fd  | ln+ΔDmLx | px+Δpx |
|-----|----------|--------|
| (3) | (11)     | (10)   |

ADDRESS OF INTERNAL DATA
MEMORY TO BE ACCESSED

ΔDmLx: LINE OFFSET VALUE OF DATA MEMORY
C: ARBITRARY CONSTANT

ADDRESS UPON EXECUTION(24 BITS)

| fd | ln | px |
|---|---|---|
| (3) | (11) | (10) |

CONSTANT VALUE(16 BITS)

| ΔDmln | ΔVmln | Δpx |
|---|---|---|
| (4) | (6) | (6) |

| fd | ln+ΔVmln | px+Δpx |
|---|---|---|
| (3) | (11) | (10) |

ADDRESS OF EXTERNAL DATA
MEMORY TO BE ACCESSED

| fd | ln+ΔDmln | px+Δpx |
|---|---|---|
| (3) | (11) | (10) |

ADDRESS OF INTERNAL DATA
MEMORY TO BE ACCESSED

ΔDmln: LINE OFFSET VALUE OF INTERNAL DATA MEMORY
ΔVmln: LINE OFFSET VALUE OF EXTERNAL DATA MEMORY

DATA DRIVEN INFORMATION PROCESSOR

BACKGROUND OF THE INVENTION

1. Field of the Invention

The present invention relates to a data driven information processor, and more particularly, to a data driven information processor having a data driven type information processing unit and a memory to be accessed upon execution of information processing by the processing unit, and capable of improving efficiency of access to the memory.

2. Description of the Background Art

A data driven information processor is one type of non-von-Neumann computer having no concept of sequential execution of instructions by a program counter. Such a data driven information processor employs architecture based on parallel processing of instructions. In the data driven information processor, an execution of an instruction is enabled upon a collection of data to be operated, and a plurality of instructions are simultaneously driven by data, so that programs are executed in parallel in accordance with a natural flow of the data. As a result, time required for operation will be drastically reduced compared to the case of von-Neumann computers. In order to further improve a processing speed of the data driven information processor, the speeding up of access to a memory (hereinafter referred to as a data memory) for storing data to be referred to or updated upon execution of processing is desired.

Figure 13:
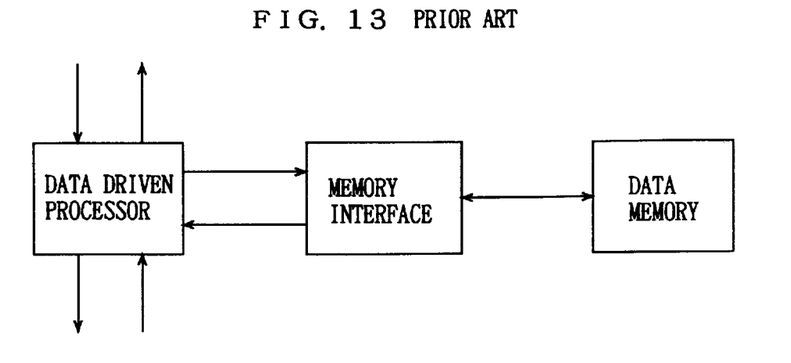
FIG. 13 is a diagram showing connection a between a conventional data driven processor and an external data memory.
Figure 14:
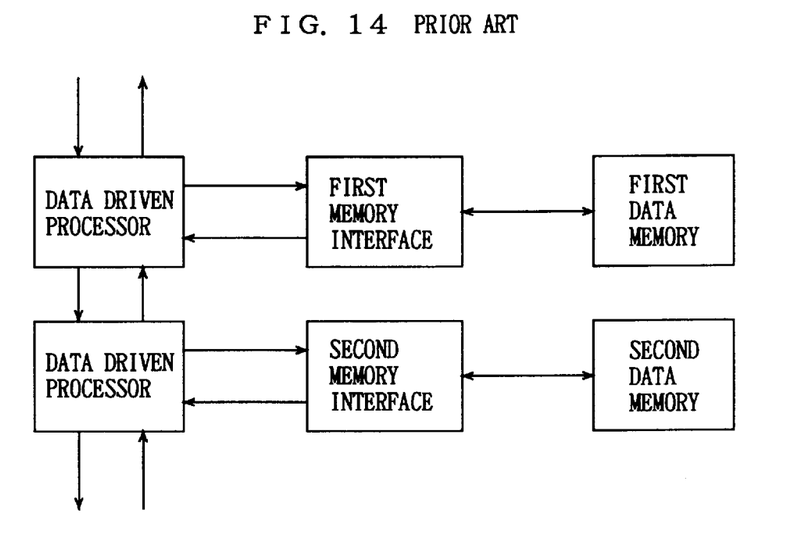
FIG. 14 is a diagram showing connection a between a plurality of conventional data driven processors and external data memories.

FIG. 13 is a diagram showing the connection of a conventional data driven processor and an external data memory, and FIG. 14 is a diagram showing connection of a plurality of conventional data driven processors and external data memories.

Figure 15:
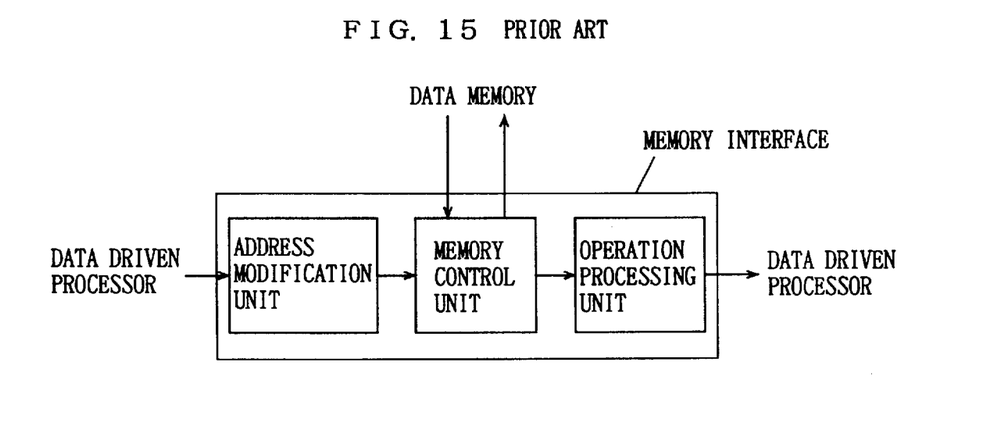
FIG. 15 is a diagram showing a structure of a memory interface for a conventional data driven processor.

FIG. 15 is a diagram showing a structure of a memory interface for a conventional data driven processor.

In conventional data driven processors, a multi-processor system consisting of a plurality of processors and a plurality of memory interfaces is proposed in an article entitled "An Evaluation of Parallel-Processing in the Dynamic Data Driven Processor", pp. 9–18 issued on Nov. 12, 1991 in the Micro Computer Architecture Symposium sponsored by Information Processing Society of Japan.

In the conventional processor proposed therein, although a data memory (hereinafter referred to as an internal data memory) incorporated into the processor or a data memory (hereinafter referred to as an external data memory) located external to the processor is connected to a single memory interface, data cannot be read/written from and to both memories simultaneously. In other words, since the conventional data driven processor allows an access to only one data memory for one memory interface, only one data can be accessed for a single access time (see FIG. 13). Accordingly, a double access time is required to access data in both internal and external data memories, so that the speeding up of processing has been prevented.

In addition, in the conventional data driven processor, although an addresses of a data memory is modified by address modification, addresses in a plurality of different data memories cannot be modified using this address modification. Therefore, in order to access first and second data memories, first and second memory interfaces for respectively accessing to the first and the second memories are required as shown in FIG. 14, thereby causing an increase in cost and preventing a reduction in device size.

Furthermore, in the conventional data driven information processor, an internal data memory and a cache memory are not provided separately, and therefore, there has been no facility which accesses data in each of the internal data memory and the cache memory simultaneously.

In addition, the conventional data driven processor is not provided with a function to store a program in a memory interface, and therefore, a data memory cannot be accessed without processing by a host processor (see FIG. 15). Accordingly, frequent accesses to the data memory cause an increase in load on the host processor, so that speeding up of the whole processing has been prevented.

SUMMARY OF THE INVENTION

It is an object of the present invention to provide a data driven information processor having a plurality of a data memories, which is capable of increasing processing speed, including access to each data memory.

In order to achieve this object, the data driven information processor in accordance with the present invention includes a processing unit for receiving an applied data packet, processing the content of the received data packet, and outputting a data packet which stores a result of the processing and subsequent program data of a first prestored data flow program; and a memory control unit having a plurality of data memories for storing data to be referred to or updated upon execution of processing in the information processor for inputting/outputting data to and from the processing unit.

The memory control unit further includes an input unit for receiving, processing and outputting an applied data packet; an access unit for receiving a data packet output from the input unit, accessing at least one of the plurality of data memories in parallel based on the content of the received data packet, and outputting the received data packet which stores a result of the access upon each access to each data memory; an operation unit for receiving a data packet output from the access unit, operating the result of the access in the received data packet in accordance with the content of the received data packet, storing a result of the operation in the received data packet, and outputting the received data packet; and a program storage unit for receiving a data packet output from the operation unit and outputting a data packet which stores both a result of the operation in the received data packet and subsequent program data in a second prestored data flow program.

According to the above described data driven information processor, since a plurality of data memories can be accessed in parallel by the access unit of the memory control unit in a single access time, improvement in a speed of the entire processing, including access to each data memory, of the information processor can be achieved. The memory control unit stores the second data flow program in the program storage unit, so that program control for access to a data memory can be achieved independently of control of the processing unit. Thus, the load on the processing unit is reduced, resulting in a higher processing speed of the processing unit.

Since the input unit in the memory control unit of the above described data driven information processor includes an address operation unit for calculating an address for parallel access by the access unit based on the content of a data packet and on address modification data, address modification for a plurality of data memories can be carried out.

If the plurality of data memories include an external data memory and one or more internal data memories, each having a different access speed, parallel access to the external and the internal data memories as well as parallel access to a plurality of internal data memories each having a different access speed can be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will now be described in conjunction with the accompanying drawings.

In the following description, a data cache indicates a memory with smaller capacity than internal and external data memories, which can be accessed at a higher speed than those memories. Further, an internal data memory indicates a memory with smaller capacity than an external data memory, which can be accessed at a higher speed than the external data memory.

Figure 1:
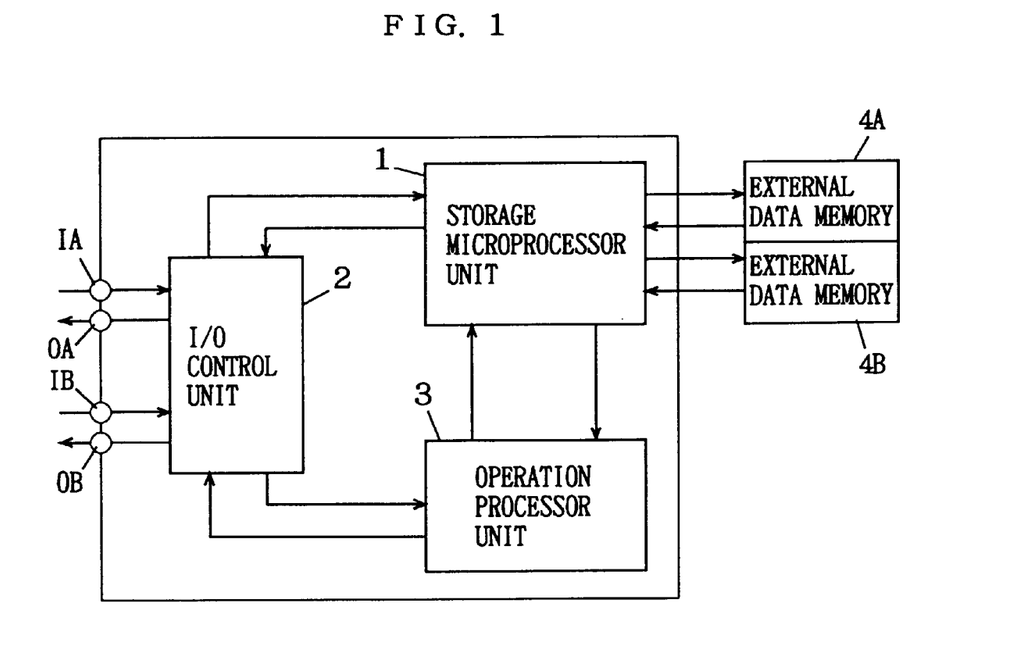
FIG. 1 is a diagram schematically showing a structure of a data driven information processor in accordance with an embodiment of the present invention.

FIG. 1 schematically shows a structure of a data driven information processor in accordance with an embodiment of the present invention.

Figure 2A:
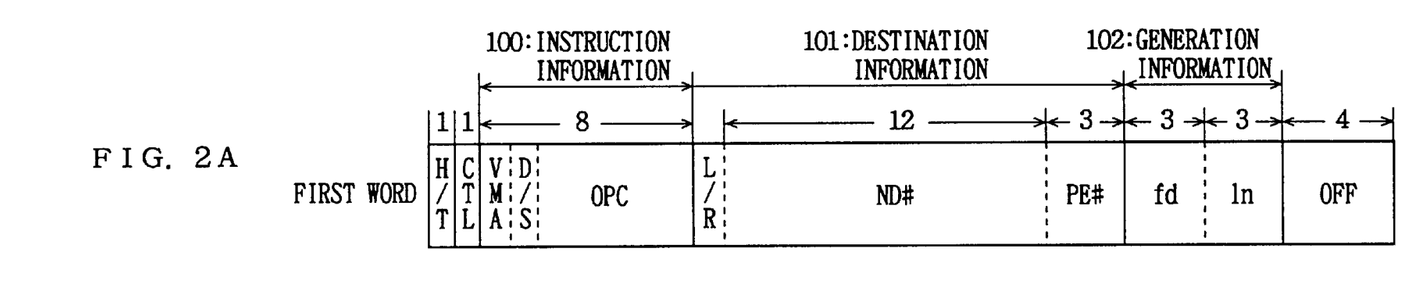
FIGS. 2A and 2B are diagrams showing a format of an I/O packet of the data driven information processor of FIG. 1.
Figure 2B:
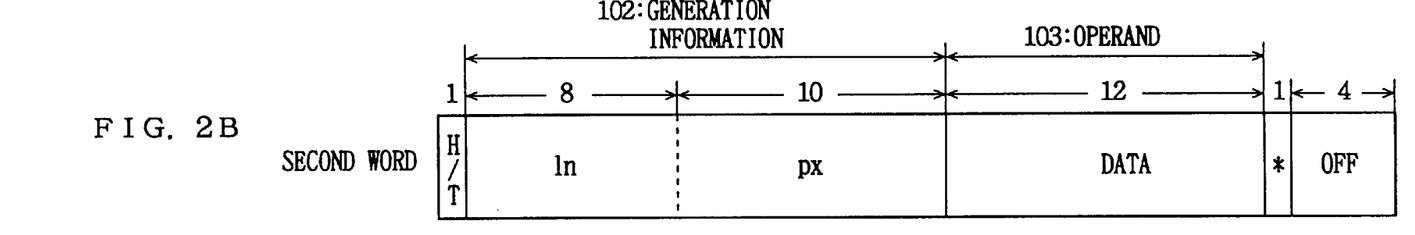

FIGS. 2A and 2B show a format of an I/O packet of the data driven information processor of FIG. 1.

Data to be processed in the data driven information processor of FIG. 1 has a data packet structure shown in FIGS. 2A and 2B. A packet for access to a video memory, which will be described later, is formed of two words each having 36 bits as shown in FIGS. 2A and 2B, and a packet other than that packet is formed of two words each having 32 bits without a generation offset OFF in FIGS. 2A and 2B. A data packet stores instruction information 100, destination information 101, generation information 102 and an operand 103.

Instruction information 100 includes an operation code OPC, and destination information 101 includes a node number ND# and a processor number PE#.

Generation information 102 is information allotted when the packet stores time series data for video signal processing or the like. Generation information 102 is allotted to a data packet in accordance with the input-time order to the information processor. Generation information 102 is used as an address for access to a video memory as will be described below, and includes a 3-bit field address fd, an 11-bit line address in and a 10-bit pixel address px. Operand 103 includes operand data DATA which is processed with operation code OPC.

The data driven information processor of FIG. 1 includes a storage microprocessor unit 1, an I/O control unit 2 having input ports IA and IB and output ports OA and OB for controlling input/output of a data packet to and from the processor, and an operation processor unit 3, and externally connects with external data memories 4A and 4B.

I/O control unit 2 receives a data packet externally, and outputs the data packet to storage microprocessor unit 1 or operation processor unit 3. Storage microprocessor unit 1 performs reading/writing from and to each type of data memory and operation processing accompanying the reading/writing, and is able to access an internal data memory and an external data memory (4A, 4B) which will be described below. Operation processor unit 3 is similar to that in the conventional data driven processor.

A data packet input through I/O control unit 2 to the information processor is processed in accordance with a data flow program stored in each of storage microprocessor unit 1 and operation processor unit 3. In this case, the data packet may be output from storage microprocessor unit 1 to operation processor unit 3, or may be output from operation processor unit 3 to storage microprocessor unit 1, depending on the processing of the program. The data packet which has been processed within the information processor is output to the outside of the information processor from I/O control unit 2.

Figure 3:
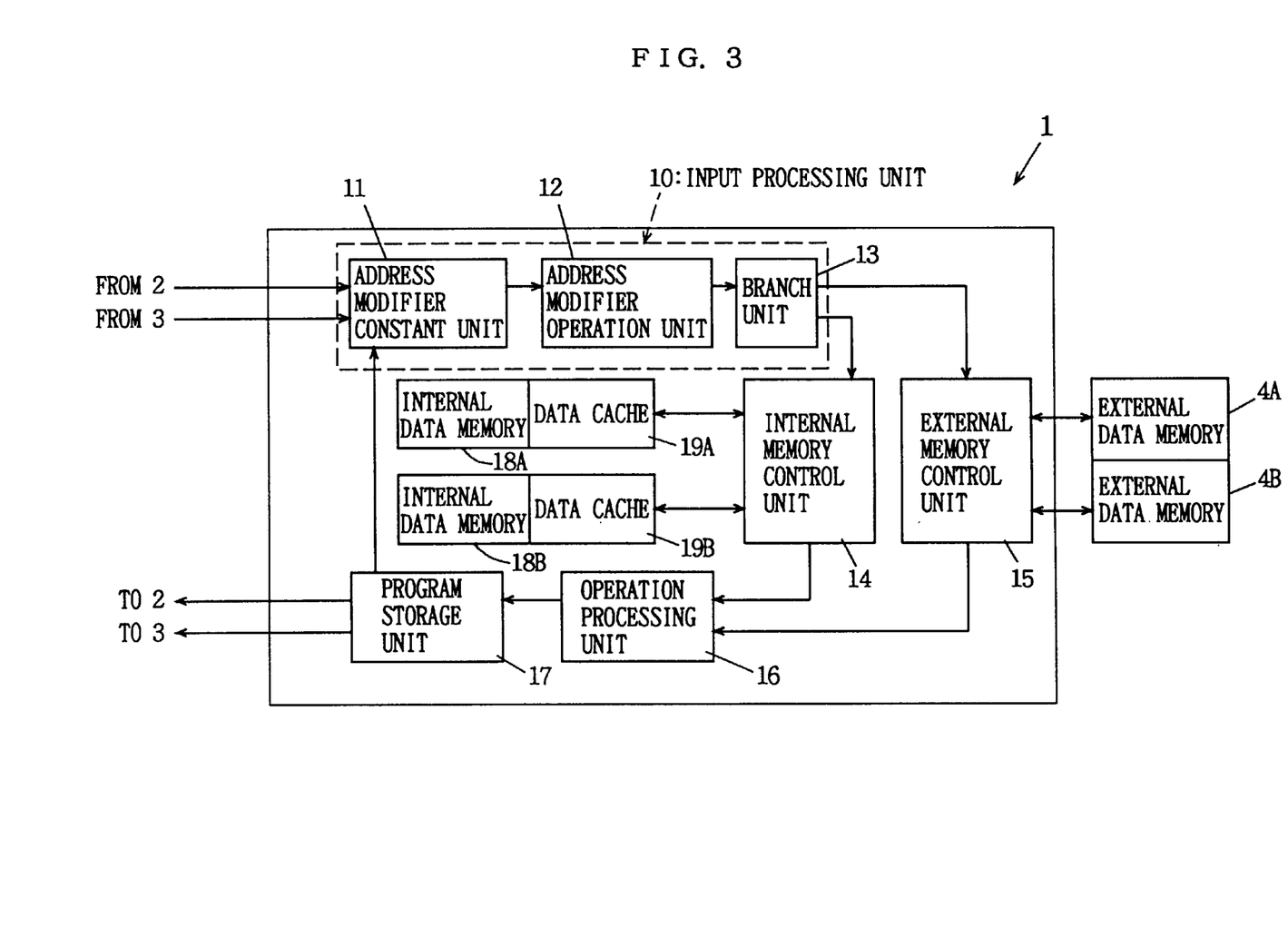
FIG. 3 is a diagram showing a structure of a storage microprocessor unit in FIG. 1.

FIG. 3 shows a structure of storage microprocessor unit 1 of FIG. 1. Storage microprocessor unit 1 of FIG. 3 includes an input processing unit 10 for processing and outputting a data packet received from I/O control unit 2 or operation processor unit 3; an internal memory control unit 14 for controlling access to internal data memories 18A and 18B as well as data caches 19A and 19B; an external memory control unit 15 for controlling access to external data memories 4A and 4B; an operation processing unit 16; and a program storage unit 17 for prestoring a data flow program mainly for access to a data memory and processing of the access result.

Input processing unit 10 includes an address modifier constant unit 11, an address modifier operation unit 12 and a branch unit 13. An external data memory, an internal data memory and a data cache are prepared to make one set as shown in the figure, since memories in each set are accessed (interleaved) alternately on a one-by-one basis so as to achieve high-speed access to a memory.

Address modifier constant unit 11 includes a memory (not shown) for prestoring at least one constant value for address modification. Upon receiving a data packet, constant unit 11 reads a constant value from the memory based on the content of the received data packet to store the constant value in the received data packet as a generation offset OFF, and outputs the packet.

Based on an operation code OPC of the data packet, address modifier operation unit 12 calculates an address for accessing each memory from a constant value of generation offset OFF and an address value (generation information 102) in the data packet applied from constant unit 11; stores the address resulting from the calculation in the data packet as generation information 102; and outputs the data packet to branch unit 13.

Based on instruction information 100 of the data packet, branch unit 13 outputs the data packet to internal memory control unit 14 if it determines that an address to be accessed is an address of an internal memory (memories 18A and 18B or data caches 19A and 19B), outputs the data packet to external memory control unit 15 if it determines that an address to be accessed is an address of external data memories 4A and 4B, and outputs the data packet in parallel to internal memory control unit 14 and external memory control unit 15 if it determines that an address to be accessed is both an address of internal memories (memories 18A and 18B, or data caches 19A and 19B) and an address of external data memories 4A and 4B.

Then, the data packet which stores, as an operand 103, the result of access to a corresponding data memory through each control unit is output to operation processing unit 16. Operation processing unit 16 operates corresponding operand 103 based on an operation code OPC of the data packet, stores the data of the result of the operation in the data packet as operand 103 and outputs the packet to program storage unit 17. Operation processing unit 16 only performs an operation of data obtained by access to a memory, and an operation other than that is carried out in operation processor unit 3.

Program storage unit 17 reads the subsequent program data from the prestored data flow program in accordance with the content of the data packet received from operation processing unit 16, and stores the program data in the data packet. Then, program storage unit 17 outputs the data packet to address modifier constant unit 11 if destination information 101 in the received data packet indicates the inside of storage microprocessor unit 1, and outputs the data packet to operation processor unit 3 external to storage microprocessor unit 1 if destination information 101 in the received data packet indicates operation processor unit 3. If destination information 101 indicates the outside of the data driven information processor, the received data packet is output to the outside of the information processor through I/O control unit 2.

Figure 4:
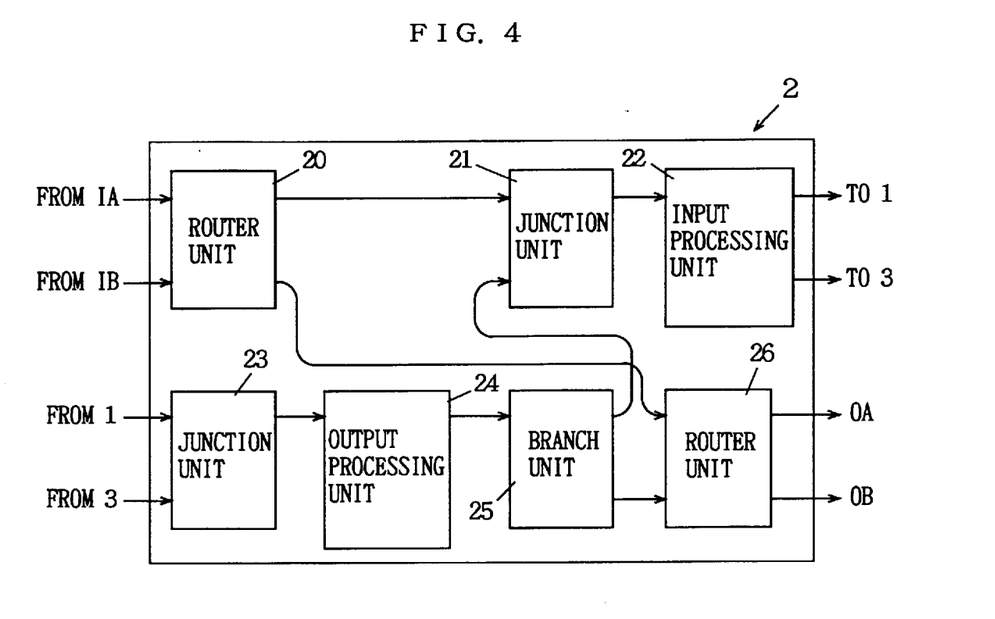
FIG. 4 is a diagram showing a structure of an I/O control unit in FIG. 1.

FIG. 4 shows a structure of I/O control unit 2 of FIG. 1. In the figure, I/O control unit 2 includes router units 20 and 26 for controlling a path of a data packet, junction units 21 and 23, an input processing unit 22, a branch unit 25 and an output processing unit 24.

Router unit 20 receives a data packet applied from the outside of the information processor through an input port IA or IB and identifies destination information 101 thereof so as to output the data packet to router unit 26 if the destination information 101 indicates the outside of the information processor, and to output the data packet to junction unit 21 if the destination information 101 indicates the inside of the information processor. Junction unit 23 sequentially receives data packets applied from storage microprocessor unit 1 and operation processor unit 3 and outputs a data packet to output processing unit 24.

Output processing unit 24 converts a data packet received from junction unit 23 from a data packet having a data format of the inside of the information processor into a data packet having a data format of the outside of the information processor to output the resultant data packet to branch unit 25. If destination information 101 of the data packet received from output processing unit 24 indicates the outside of the information processor, branch unit 25 outputs the received data packet to router unit 26, and if the destination information 101 indicates the inside of the information processor, branch unit 25 outputs the received data packet to junction unit 21.

Router unit 26 outputs the data packet received from router unit 20 or branch unit 25 to the outside of the information processor through either output port OA or OB, based on destination information 101 of the received data packet. Junction unit 21 sequentially receives data packets applied from branch unit 25 and router unit 20 to output a data packet to input processing unit 22. Input processing unit 22 converts the data packet received from junction unit 21 from a packet having a data format of the outside of the information processor into a data packet having a data format of the inside of the information processor, and outputs the resultant data packet either storage microprocessor unit 1 or operation processor unit 3 based on destination information 101 of the packet.

Figure 5:
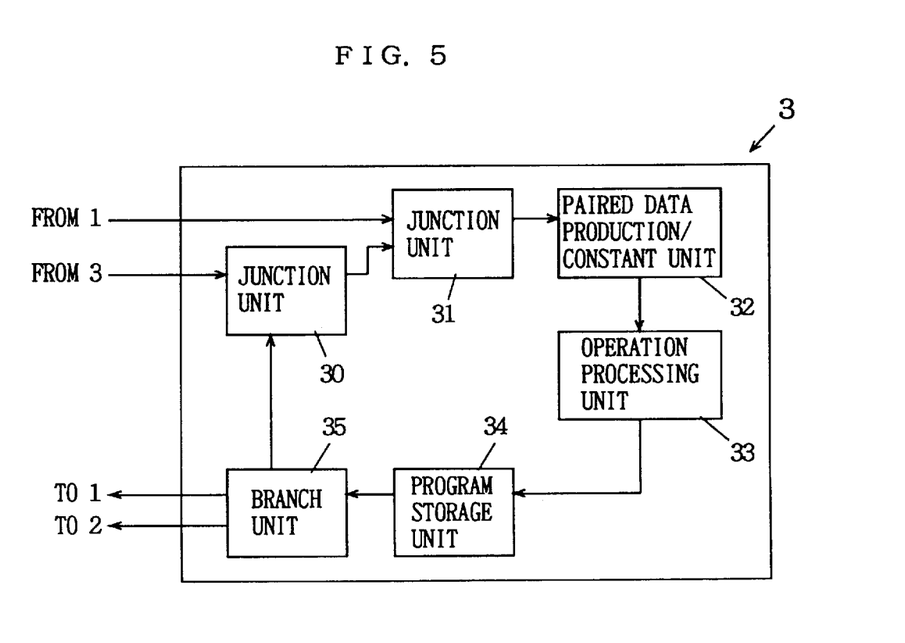
FIG. 5 is a diagram showing a structure of an operation processor unit in FIG. 1.

FIG. 5 shows a structure of operation processor unit 3 of FIG. 1. In the figure, operation processor unit 3 includes junction units 30 and 31, a paired data production/constant unit 32, an operation processing unit 33, a program storage unit 34 and a branch unit 34. Since the data processing in paired data production/constant unit 32, operation processing unit 33 and program storage unit 34 is described in detail in the above mentioned article "An Evaluation of Parallel-Processing in the Dynamic Data Driven Processor", a description of which will be given briefly herein.

Junction unit 30 sequentially receives data packets applied from I/O control unit 2 and branch unit 33 and outputs a data packet to junction unit 31. Junction unit 31 sequentially receives data packets applied from junction unit 30 and storage microprocessor unit 1 and outputs a data packet to paired data production/constant unit 32.

Paired data production/constant unit 32 sequentially receives data packets applied from junction unit 31, and produces a pair of operand data DATA which can be operated, or produces, if constant data corresponding to the received data packet is prestored in the constant unit, a pair of operant data DATA of the received data packet and the constant data. The data pair produced is stored in the received data packet as operand data DATA, and the data packet is output to operation processing unit 33.

Operation processing unit 33 receives the data packet output from paired data production/constant unit 32, processes a data pair in the received packet in accordance with instruction information 100 in the received packet, and outputs the data packet which stores data of the result as operand data DATA to program storage unit 34.

Program storage unit 34 prestores a data flow program. When program storage unit 34 receives the data packet applied from operation processing unit 33, it reads the subsequent program data from the program based on a node number ND# and generation information 102 of the received data packet, stores the program data in the received packet, and outputs the packet to branch unit 35.

When branch unit 35 receives the data packet applied from program storage unit 34, it outputs the data packet to either junction unit 30, storage microprocessor unit 1 or I/O control unit 2 based on destination information 101 thereof.

Storage microprocessor unit 1 has program storage unit 17 as shown in FIG. 3, so that control of a program for access to a data memory in the information processor can be performed independently of control of a program stored in program storage unit 34 of operation processor unit 3. Accordingly, since operation processing by the operation processor unit 3 and access to a data memory by the microprocessor unit 1 can be carried out in parallel, load on the operation processor unit 3 is reduced and processing speed in the information processor is improved compared to a conventional example.

Storage microprocessor unit 1 includes input processing unit 10, internal memory control unit 14 and external memory control unit 15, so that parallel access to data memories 18A and 18B, data caches 19A and 19B and external data memories 4A and 4B can be performed for a single access time. This access to a memory will now be described in detail using, as an example, image data processing which particularly requires high speed processing and handles a large amount of data, assuming that internal and external data memories are video memories.

Figure 6:
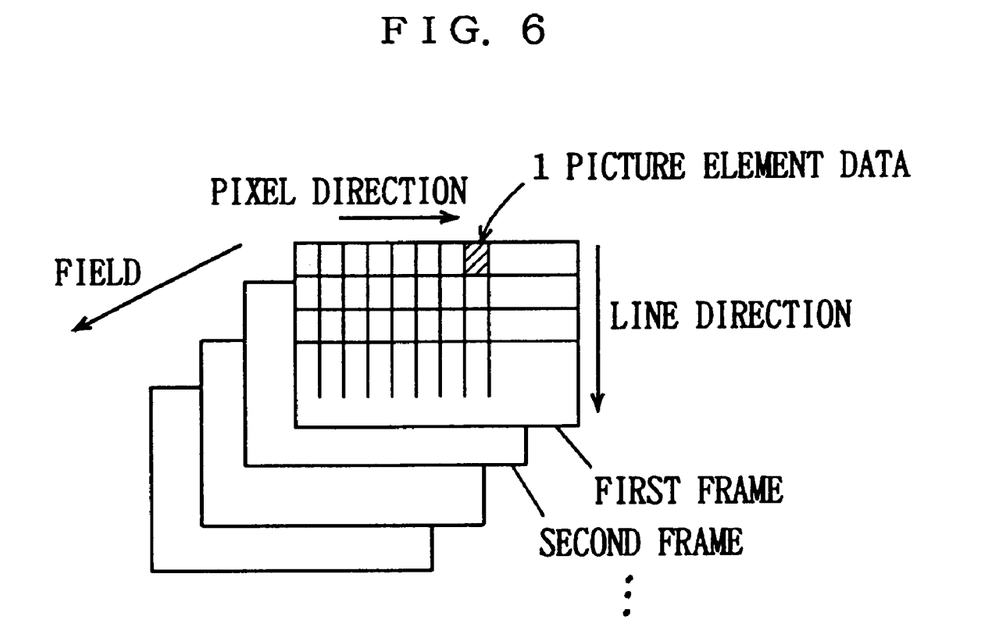
FIG. 6 is a diagram showing a structure of image data in accordance with an embodiment of the present invention.

FIG. 6 is a diagram showing a structure of image data in accordance with an embodiment of the present invention. As shown in the figure, image data consists of a plurality of frames (fields), each frame is constituted by a plurality of picture element data arranged two-dimentionally (in pixel and line directions), and each picture element data in image data is identified (addressed) uniquely on a data memory by an address (field, pixel direction, line direction).

Characteristic processing of image data processing includes filtering processing. In the filtering processing, a comparison between data adjacent to each other in the pixel direction, a comparison between data adjacent to each other in the line direction, and the comparison between fields adjacent to each other are carried out for picture element data. In this case, information on picture element data in the pixel direction of image data is stored in data caches 19A and 19B, information on picture element data in the line direction of image data is stored in internal data memories 18A and 18B, and information on a field of image data is stored in external data memories 4A and 4B. It is herein noted that a pixel address px is used to identify picture element data in the pixel direction of a data memory, a line address ln is used to identify picture element data in the line direction on a data memory, and a field address fd is used to identify picture element data by field. Access to a memory in accordance with the present embodiment will now be described with reference to FIGS. 7 to 12.

It is noted that a constant value (16 bits) of FIGS. 7 to 12 is applied as a generation offset OFF to address modifier operation unit 12 by address modifier constant unit 11 of FIG. 3. Operation of calculating an address to be accessed from an address (24 bits) upon execution indicated by generation information 102 and from a constant value (16 bits), storing the calculated address in a data packet as generation information 102 and outputting the data packet is carried out by address modifier operation unit 12.

Figure 7A:
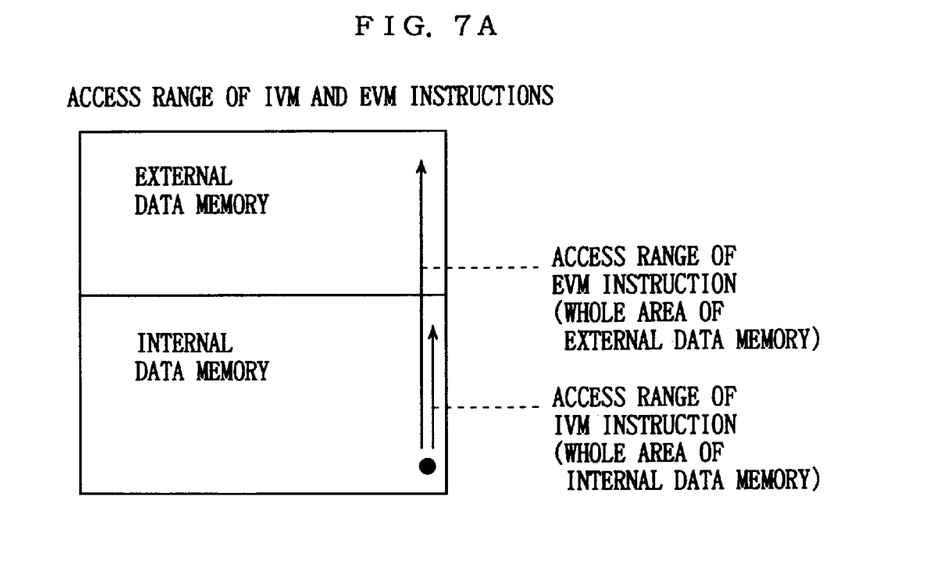
FIGS. 7A and 7B are diagrams illustrating access to an internal data memory and an external data memory in accordance with an embodiment of the present invention.
Figure 7B:
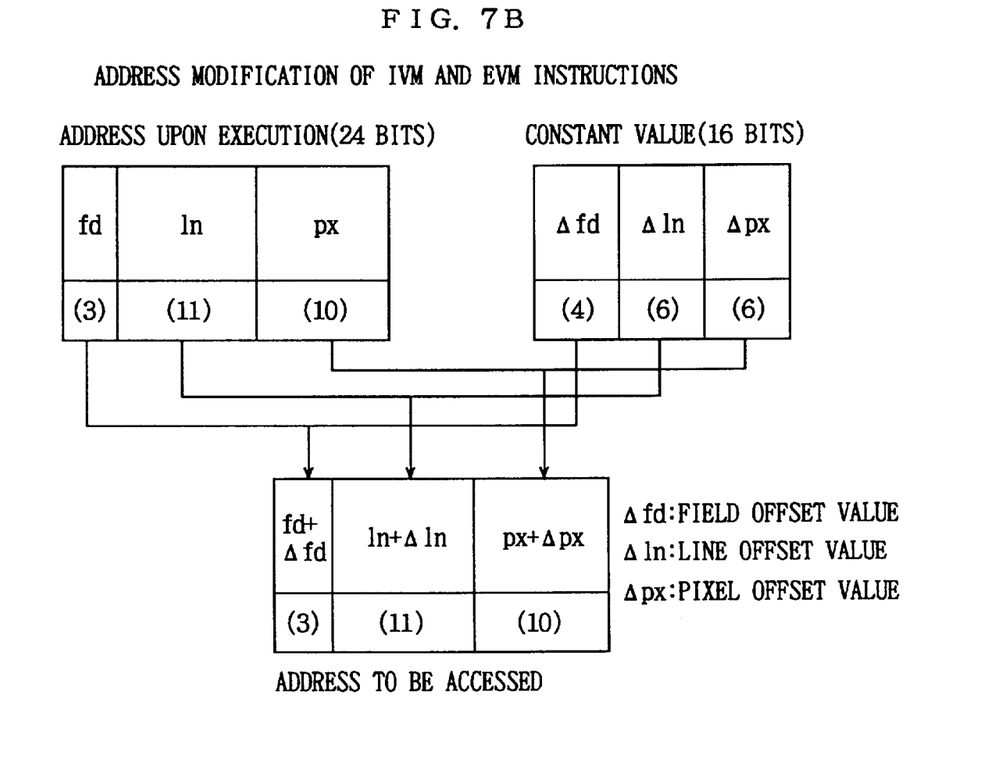

FIGS. 7A and 7B are diagrams illustrating access to an internal data memory and an external data memory in accordance with an embodiment of the present invention.

FIG. 7A shows an example of access to internal data memory 18A or 18B. An IVM (Internal Video Memory) instruction is set in an operation code OPC for carrying out this access. The whole area of internal data memory 18A or 18B can be accessed in accordance with the IVM instruction.

In addition, FIG. 7A shows an example of access to external data memory 4A or 4B. An EVM (External Video Memory) instruction is set in an operation code OPC for carrying out this access. The whole area of external data memory 4A or 4B can be accessed in accordance with the EVM instruction.

Although the same address for access is used in both the IVM instruction and the EVM instruction, the internal data memory and the external data memory are provided separately as shown in FIG. 3, so that access thereto is carried out separately.

FIG. 7B shows a relationship between an address and an address modification value (hereinafter referred to simply as a constant value) of address modifier constant unit 11. An address upon execution is indicated by a field address fd, a line address ln and a pixel address px in a data memory. Picture element data in the data memory can be accessed by generation information 102.

An address (fd, ln, px) upon execution is converted into an address of internal data memory 18A or 18B and external data memory 4A or 4B in address modifier operation unit 12, using a constant value (a field offset value $\Delta fd$, a line offset value $\Delta ln$, a pixel offset value $\Delta px$) applied by address modifier constant unit 11 of FIG. 3 as an offset value. Then, each data memory is accessed through internal memory control unit 14 or external memory control unit 15 based on the address (fd+$\Delta fd$, ln+$\Delta ln$, px+$\Delta px$) obtained by conversion.

Figure 8:
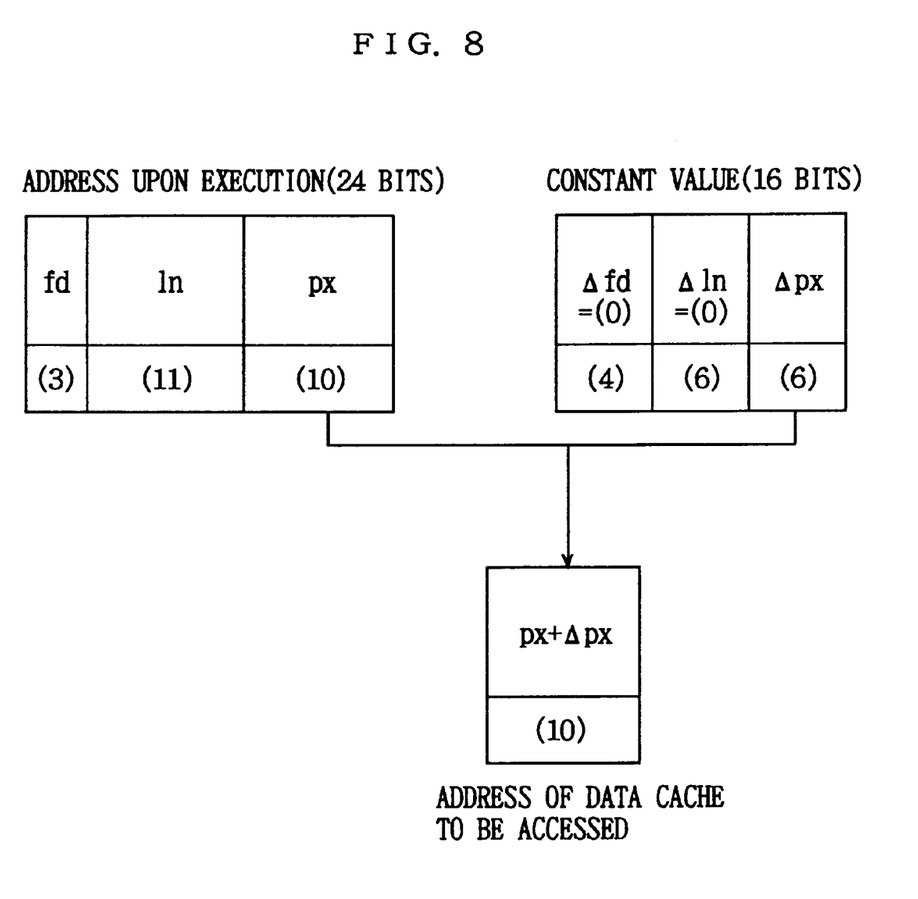
FIG. 8 is a diagram illustrating simultaneous access to internal and external data memories in accordance with is an embodiment of the present invention.

FIG. 8 is a diagram illustrating simultaneous access to an internal data memory and an external data memory in accordance with an embodiment of the present invention. A CPX (ALU for Complex operation) instruction is set in an operation code OPC for carrying out this access. Since only a pixel offset value $\Delta px$ of the constant value is valid in the CPX instruction, data cache 19A or 19B is accessed.

Figure 9A:
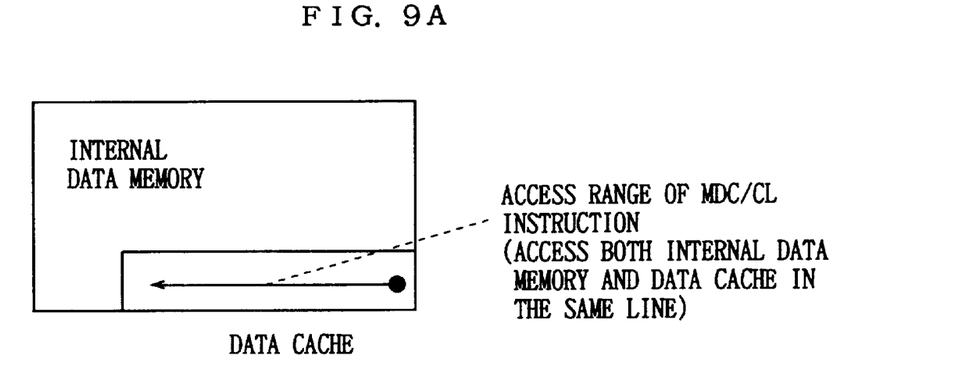
FIGS. 9A and 9B are diagrams illustrating access to addresses of the same line of an internal data memory and a data cache in accordance with an embodiment of the present invention.
Figure 9B:
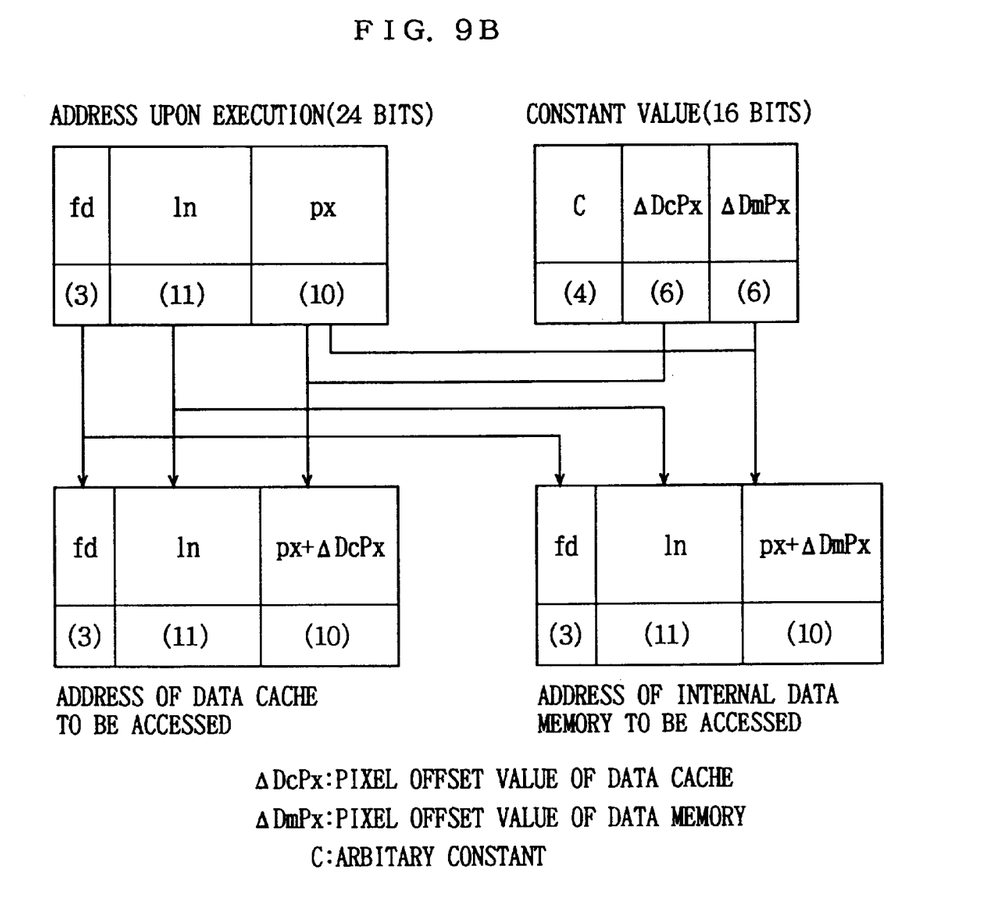

FIGS. 9A and 9B are diagrams illustrating access to addresses of the same line of an internal data memory and a data cache in accordance with an embodiment of the present invention. An MDC/CL (Multiple access with Data Cache in Common Line) instruction is set in an operation code OPC for carrying out this access. Since a pixel offset value $\Delta DmPx$ of an internal data memory and a pixel offset value $\Delta DcPx$ of a data cache are included in a constant value in the MDC/CM instruction, separate pixel addresses px for internal data memory 18A or 18B and data cache 19A or 19B are accessed. In this case, an offset value $\Delta ln$ for a line address ln is not included in the constant value.

Figure 10A:
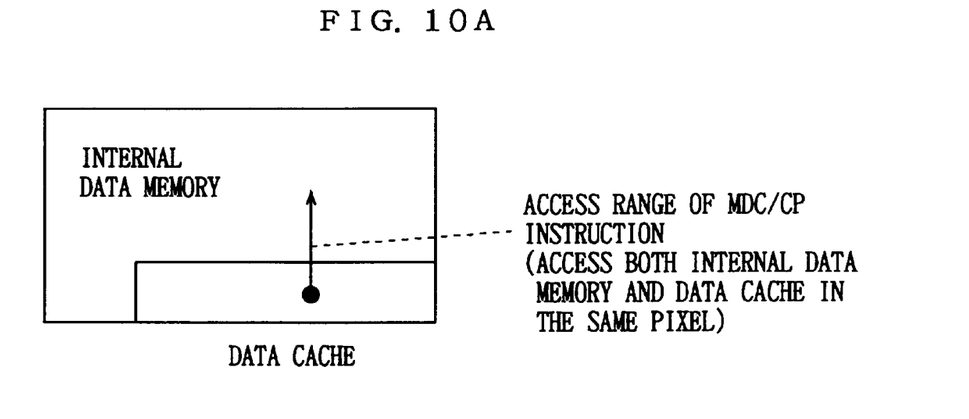
FIGS. 10A and 10B are diagrams illustrating access to addresses of the same pixel of an internal data memory and a data cache in accordance with an embodiment of the present invention.
Figure 10B:
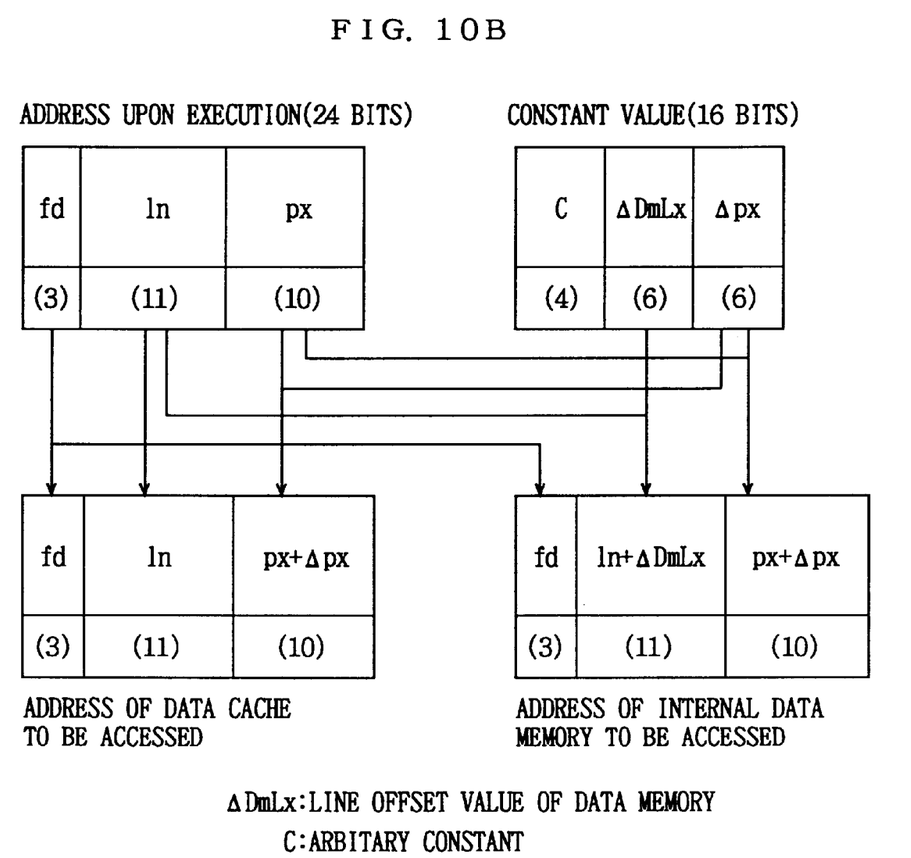

FIGS. 10A and 10B are diagrams illustrating access to addresses of the same pixel of an internal data memory and a data cache in accordance with an embodiment of the present invention. An MDC/CP (Multiple access with a Data Cache in Common Pixel) instruction is set in an operation code OPC for carrying out this access. Since only an offset value $\Delta DmLx$ for a line address ln of internal data memory 18A or 18B is included in a constant value in the MDC/CP instruction, a line address ln of internal data memory 18A or 18B is accessed. In this case, a pixel offset value $\Delta Px$ for a pixel address px is common to internal data memory 18A or 18B and data cache 19A or 19B.

Figure 11A:
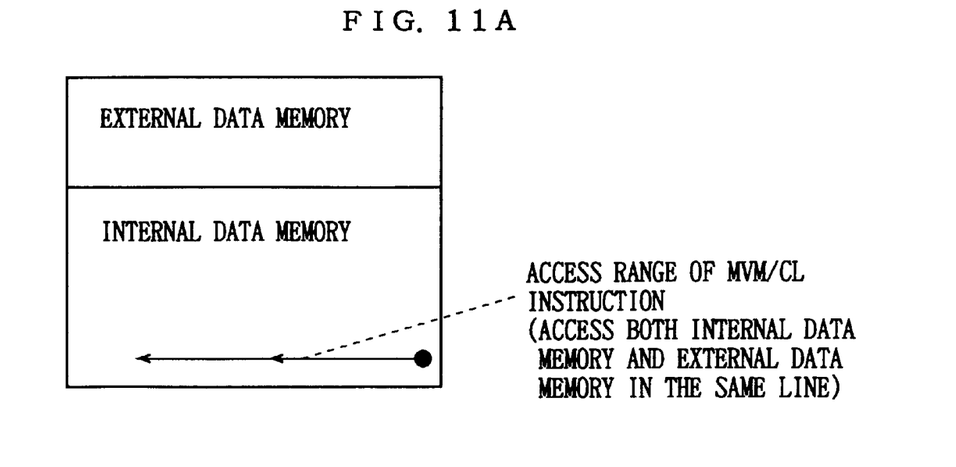
FIGS. 11A and 11B are diagrams illustrating access to addresses of the same line of an external data memory and an internal data memory in accordance with an embodiment of the present invention.
Figure 11B:
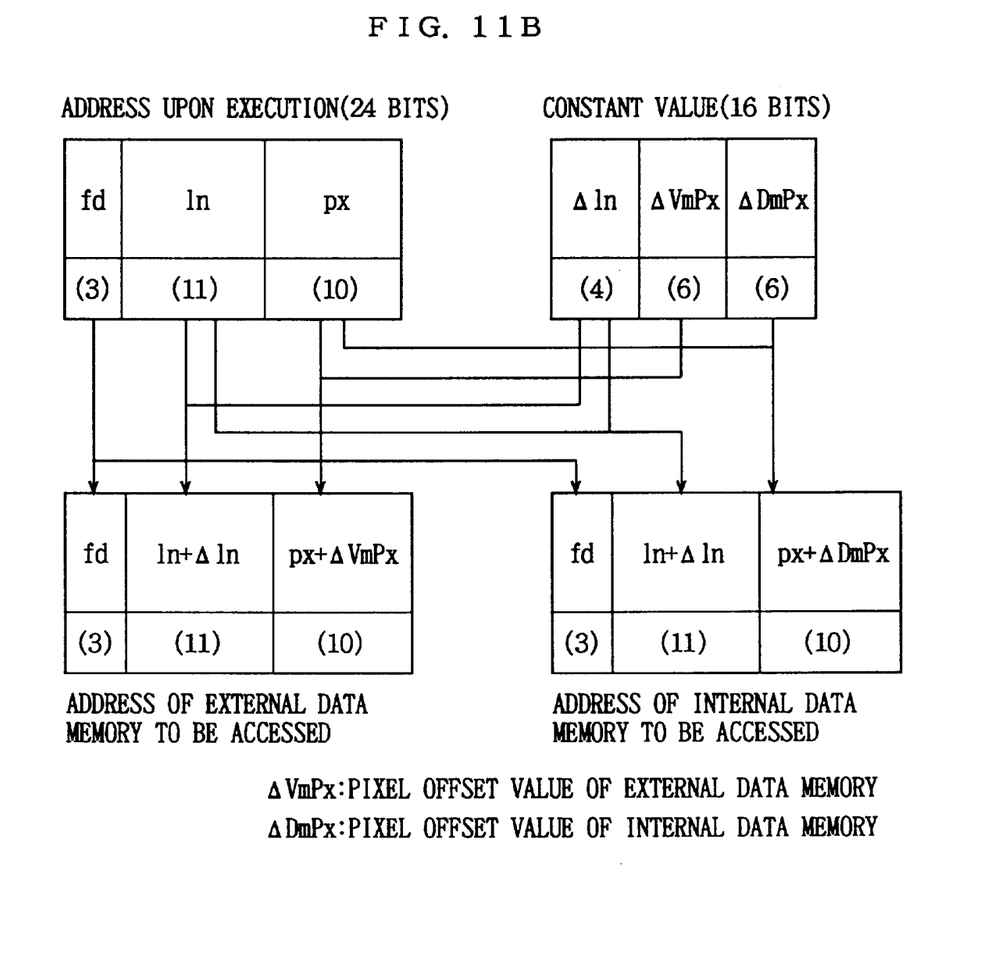

FIGS. 11A and 11B are diagrams illustrating access to addresses of the same line of an external data memory and an internal data memory in accordance with an embodiment of the present invention.

An MVM/CL (Multiple access with Video Memory in Common Line) instruction is set in an operation code OPC for carrying out this access. Since offset values ΔDmPx and ΔVmPx for pixel addresses of internal data memory 18A or 18B and external data memory 4A or 4B are included in a constant value in the MVM/CL instruction, separate pixel addresses px of internal data memory 18A or 18B and external data memory 4A or 4B are accessed. In this case, an offset value Δln for a line address ln is common to internal data memory 18A or 18B and external data memory 4A or 4B.

Figure 12A:
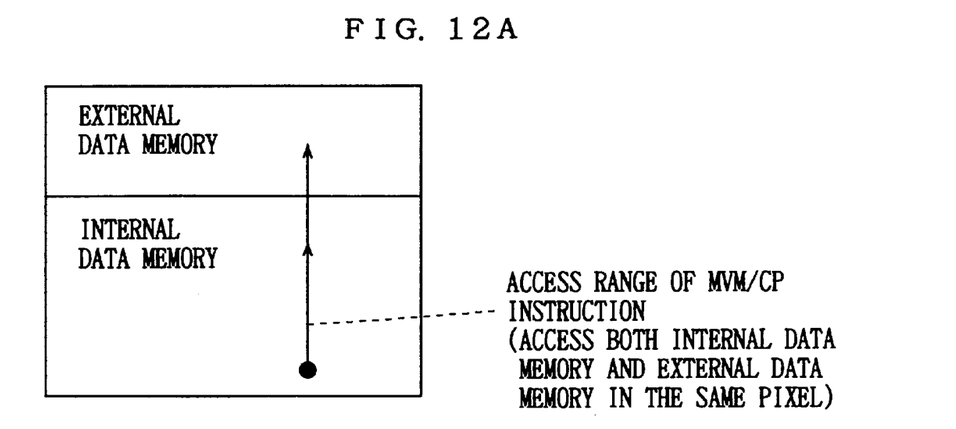
FIGS. 12A and 12B are diagrams illustrating access to addresses of the same pixel of an external data memory and an internal data memory in accordance with an embodiment of the present invention.
Figure 12B:
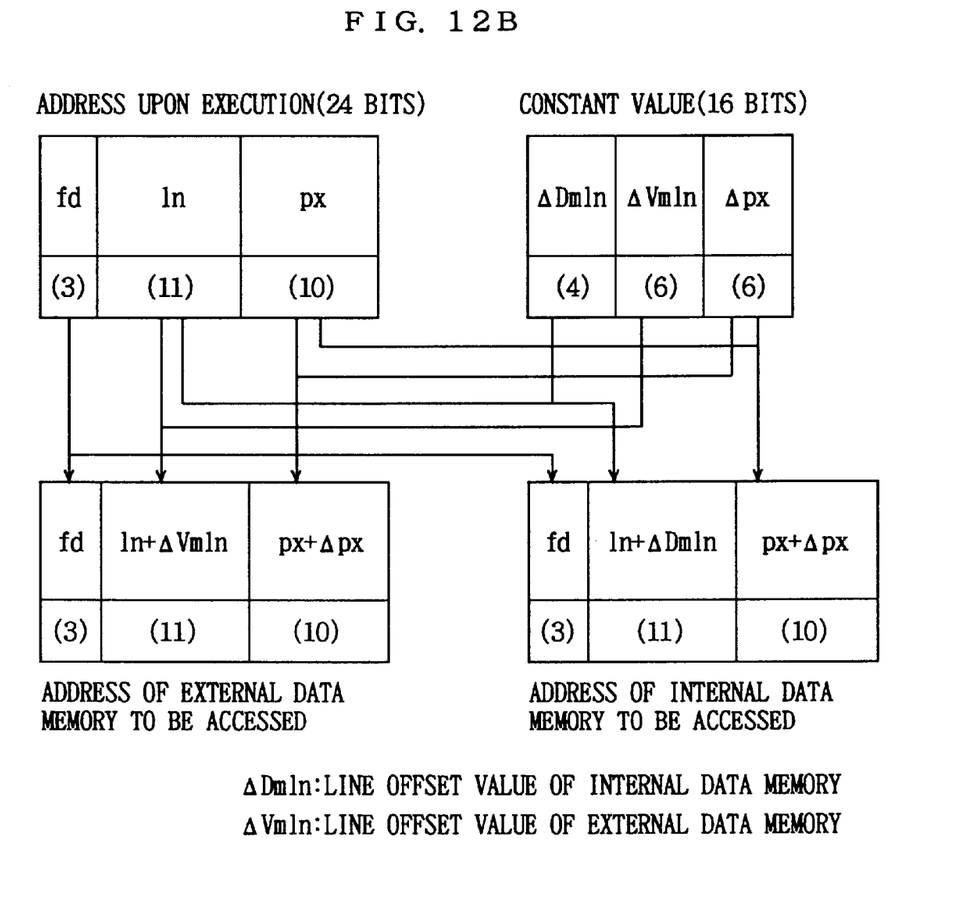

FIGS. 12A and 12B are diagrams illustrating access to address the same pixel of an external data memory and an internal data memory in accordance with an embodiment of the present invention. An MVM/CP (Multiple access with Video Memory in Common Pixel) instruction is set in an operation code OPC for carrying out this access. Since offset values ΔDmln and ΔVmln for line addresses in of internal data memory 18A or 18B and external data memory 4A or 4B are included in a constant value in the MVM/CP instruction, separate line addresses of internal data memory 18A or 18B and external data memory 4A or 4B are accessed. In this case, an offset value Δpx for a pixel address px is common to internal data memory 18A or 18B and external data memory 4A or 4B.

Since a unique program is stored in each of storage microprocessor unit 1 and operation processor unit 3 as shown in FIGS. 1, 3 and 5, parallel access to memories shown in FIGS. 7 to 12 can be carried out without processing of a program by operation processor unit 3 of a host processor.

In addition, a plurality of memory interfaces have been provided conventionally for access to a plurality of data memories, while parallel access to a plurality of different data memories can be carried out for a single access time by storage microprocessor unit 1 which is a single memory interface.

Furthermore, as shown in FIGS. 9 and 10, parallel access to internal data memory 18A or 18B and internal data cache 19A or 19B can be carried out for a single access time.

In addition, a plurality of different address modification facilities can be provided by address modifier constant unit 11 and address modifier operation unit 12, so that parallel access to different addresses of a plurality of data memories can be carried out for a single access time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor, comprising:

input means, for receiving an applied data packet;

address modification means for modifying address data in the received data packet using at least one prestored offset value to create at least one modified address;

access means for accessing at least one of a plurality of data memories, in parallel, based on the at least one modified address of the received data packet, and outputting a data packet which stores a result of each accessed data memory; and operation means for receiving said data packet output from said access means, operating on said result of the access in the received data packet in accordance with a content of the received data packet, storing a result of the operation in the received data packet, and outputting a modified data packet wherein said address modification means includes an address modification data unit for receiving said applied data packet, reading at least one prestored constant value corresponding to the received data packet from a plurality of prestored constant values based on a content of the received data packet, additionally storing the modified address data in the received data packet, and outputting the received data packet, and an address modification operation unit for receiving said data packet output from said address modification data unit, operating on said address data and said modified address data in the received data packet in accordance with a content of the received data packet, storing a result of the operation stored in the received data packet as operation result address data in place of said address data, and outputting the received data packet.

2. The data driven information processor according to claim 1, wherein said address modification means calculates a single address usable for access of a plurality of memories by said access means.

3. The data driven information processor according to claim 2, wherein said plurality of data memories includes an external data memory provided external to said data driven information processor and an internal data memory provided internal to said data driven information processor.

4. The data driven information processor according to claim 3, wherein said internal data memory includes a plurality of data memories, each having a different access speed.

5. The data driven information processor according to claim 3, wherein said address modification means includes an address modification data unit for receiving said applied data packet, reading at least one prestored constant value corresponding to the received data packet from a plurality of prestored constant values based on a content of the received data packet, additionally storing the modified address data in the received data packet, and outputting the received data packet, and an address modification operation unit for receiving said data packet output from said address modification data unit, operating on said address data and said modified address data in the received data packet in accordance with a content of the received data packet, storing a result of the operation stored in the received data packet as operation result address data in place of said address data, and outputting the received data packet.

6. The data driven information processor according to claim 5, wherein said operation result address data includes each address of one or more data memories which is accessed by said access means in accordance with a content of said data packet which stores the operation result address data.

7. The data driven information processor according to claim 6, wherein
an operation code is further stored in said data packet, and
said access means accesses at least one of said plurality of data memories, in parallel, based on said operation code and based on said operation result address data in said data packet received from said input means.

8. The data driven information processor according to claim 7, wherein
said access means includes
external access means for accessing said external data memory, and
internal access means for accessing said internal data memory, and
said input means further includes
means for outputting said data packet to be output from the input means to at least one of said external access means and said internal access means based on said operation code in the data packet.

9. The data driven information processor according to claim 5, wherein
an operation code is further stored in said data packet, and
said access means accesses at least one of said plurality of data memories, in parallel, based on said operation code and based on said operation result address data in said data packet received from said input means.

10. The data driven information processor according to claim 9, wherein
said access means includes
external access means for accessing said external data memory, and
internal access means for accessing said internal data memory, and
said input means further includes
means for outputting said data packet to be output from the input means to at least one of said external access means and said internal access means based on said operation code in the data packet.

11. The data driven information processor according to claim 2, wherein
said operation result address data includes each address of one or more data memories which is accessed by said access means in accordance with a content of said data packet which stores the operation result address data.

12. The data driven information processor according to claim 11, wherein
an operation code is further stored in said data packet, and
said access means accesses at least one of said plurality of data memories in parallel based on said operation code and said operation result address data in said data packet received from said input means.

13. The data driven information processor according to claim 12, wherein
said access means includes
external access means for accessing said external data memory, and
internal access means for accessing said internal data memory, and
said input means further includes
means for outputting said data packet to be output from the input means to at least one of said external access means and said internal access means based on said operation code in the data packet.

14. The data driven information processor according to claim 2, wherein
an operation code is further stored in said data packet, and
said access means accesses at least one of said plurality of data memories, in parallel, based on said operation code and based on said operation result address data in said data packet received from said input means.

15. The data driven information processor according to claim 14, wherein
said access means includes
external access means for accessing said external data memory, and
internal access means for accessing said internal data memory, and
said input means further includes
means for outputting said data packet to be output from the input means to at least one of said external access means and said internal access means based on said operation code in the data packet.

16. The data driven information processor according to claim 1, wherein
said plurality of data memories includes an external data memory provided external to said data driven information processor and an internal data memory provided internal to said data driven information processor.

17. The data driven information processor according to claim 16, wherein
said internal data memory includes a plurality of data memories, each having a different access speed.

18. The data driven information processor according to claim 1, wherein
an operation code is further stored in said data packet, and
said access means accesses at least one of said plurality of data memories, in parallel, based on said operation code and based on said operation result address data in said data packet received from said input means.

19. The data driven information processor according to claim 18, wherein
said access means includes
external access means for accessing said external data memory, and
internal access means for accessing said internal data memory, and
said input means further includes
means for outputting said data packet to be output from the input means to at least one of said external access means to said internal access means based on said operation code in the data packet.

20. The data driven information processor according to claim 1, wherein
said operation result address data includes each address of one or more data memories which is accessed by said access means in accordance with a content of said data packet which stores the operation result address data.

21. The data driven information processor according to claim 20, wherein
an operation code is further stored in said data packet, and
said access means accesses at least one of said plurality of data memories, in parallel, based on said operation code and based on said operation result address data in said data packet received from said input means.

22. The data driven information processor according to claim 21, wherein
said access means includes
external access means for accessing said external data memory, and internal access means for accessing said internal data memory, and said input means further includes
means for outputting said data packet to be output from the input means to at least one of said external access means and said internal access means based on said operation code in the data packet.

23. The data driven information processor according to claim 1, further comprising:

a processing unit for receiving the applied data packet from the input means, and for outputting the applied data packet to the address modification means, the applied data packet further storing a first prestored data flow program; and program storage means for receiving the data packet output from said operation means, and outputting a data packet which stores said result of the operation in the modified data packet and subsequent program data in a second prestored data flow program, said second data flow program being used for access of said plurality of data memories and for processing of resultant data of said access among said information processing in said data driven information processor, and said first data flow program being used for processing other than said access and said processing of resultant data of said access.

24. The data driven information processor according to claim 23, wherein destination information is further stored in said data packet, said processing unit outputs, based on said destination information in said data packet to be output from the processing unit, the data packet to said access means, external to the data driven information processor and internal to said processing unit, or to said input means, external to the data driven information processor, or to said processing unit.

25. The data driven information processor according to claim 1, wherein said plurality of data memories are image memories.

26. The data driven information processor of claim 1, wherein the address modification means creates at least two addresses, each used by the access means to access, in parallel, at least one data memory.

27. The data driven information processor of claim 26, wherein the at least two modified addresses are used to access two memories internal to the data driven information processor, in parallel.

28. The data driven information processor of claim 1, wherein the address modification means creates at least one modified address that is used to access a plurality of memories, in parallel.

29. The data driven information processor of claim 28, wherein the at least one modified address is used to access a memory external to the data driven information processor and the at least one modified address is used to access a memory internal to the data driven information processor, in parallel.

30. A data driven processing method, comprising the steps of:

receiving an input data packet;

modifying address data in the received data packet using at least one prestored offset value to create at least one modified address;

accessing at least one of a plurality of memories, in parallel, based upon the at least one modified address, and outputting a data packet storing data retrieved from each memory access;

operating on the data packet with the data retrieved from each memory access; and outputting a modified data packet storing a result the operation, wherein said step of modifying address data includes the substeps of, receiving said applied data packet, reading at least one prestored constant value corresponding to the received data racket from a plurality of prestored constant values based on a content of the received data packet data, additionally storing the modified address data in the received packet, and outputting the received data packet to an address modification unit which receives the data packet and the modified address data in the received data packet in accordance with a content of the received data packet, stores a result of the operation stored in the received data packet as operation result address data in place of the address data, and outputs the received data packet.

31. The method of claim 30, wherein said plurality of memories include an external data memory provided external to said data driven processor and an internal data memory provided internal to said data driven processor.

32. The method of claim 31, wherein the internal data memory includes a plurality of data memories with different access speed.

33. The method of claim 30, wherein the plurality of data memories are image memories.

34. The method of claim 30, wherein at least two modified addresses are created, each used, in parallel, to access at least one data memory.

35. The method of claim 34, wherein each at least one data memory is a memory internal to the data driven processor.

36. The method of claim 30, wherein at least one modified address is created which is used to access a plurality of memories, in parallel.

37. The method of claim 36, wherein the plurality of memories include one memory external to and one memory internal to the data driven processor.

* * * * *